US008403738B2

(12) United States Patent
Toyoda

(10) Patent No.: US 8,403,738 B2
(45) Date of Patent: Mar. 26, 2013

(54) GAMING DEVICE AND METHOD FOR DISPLAY CONTROL THEREIN

(75) Inventor: Hirobumi Toyoda, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 661 days.

(21) Appl. No.: 11/494,726

(22) Filed: Jul. 28, 2006

(65) Prior Publication Data

US 2007/0004512 A1 Jan. 4, 2007

(51) Int. Cl.
*A63F 9/24* (2006.01)
*A63F 13/00* (2006.01)
*G06F 17/00* (2006.01)
*G06F 19/00* (2011.01)

(52) U.S. Cl. ................................ 463/13; 463/11; 463/12

(58) Field of Classification Search ............... 463/11–13
See application file for complete search history.

(56) References Cited

U.S. PATENT DOCUMENTS

| | | | | | |
|---|---|---|---|---|---|
| 5,669,817 | A * | 9/1997 | Tarantino | ........................ | 463/13 |
| 5,947,821 | A * | 9/1999 | Stone | ........................ | 463/13 |
| 6,132,311 | A * | 10/2000 | Williams | ........................ | 463/13 |
| 7,758,425 | B2 * | 7/2010 | Poh et al. | ........................ | 463/42 |
| 2004/0121839 | A1 * | 6/2004 | Webb | ........................ | 463/29 |
| 2005/0037834 | A1 * | 2/2005 | Stern et al. | ........................ | 463/20 |
| 2006/0068864 | A1 * | 3/2006 | White et al. | ........................ | 463/13 |

FOREIGN PATENT DOCUMENTS

WO WO 2005/123206 A1 12/2005

* cited by examiner

*Primary Examiner* — Michael Cuff
*Assistant Examiner* — Kevin Y Kim
(74) *Attorney, Agent, or Firm* — Lexyoume IP Meister, PLLC.

(57) ABSTRACT

A gaming device having a card game using a card set is provided with: an input device configured to receive an input by a player; a display device configured to display one or more cards selected from the card set in any of face-up and face-down states; a controller configured to control the display device to show a face of a target card selected from the cards in the face-down state in part to an extent determined by the input.

7 Claims, 15 Drawing Sheets

GAMING DEVICE AND METHOD FOR DISPLAY CONTROL THEREIN

CROSS-REFERENCE TO RELATED APPLICATIONS

The contents of prior Japanese Patent Application No. 2005-041206 (filed on Feb. 17, 2005) are incorporated herein by reference in its entirety.

BACKGROUND OF THE INVENTION

1. Field of the Invention

The present invention relates to a gaming device having a card game, in which a player may enjoy squeezing tactics, and a method for display control therein.

2. Description of the Related Art

There had been proposed many gaming devices to provide virtual games implemented on displays with the assistance of digital equipments instead of using real items such as slot machines and cards, in which games in the real world are ingeniously adapted to virtual worlds on the displays. These gaming devices generally succeed in implementing simple actions of the real games, such as dealing cards, taking bets and judging who is a winner. However, sensitive and complex schemes, such as any tactics among players, are uneasy to be implemented in these gaming devices.

In real casinos, a variety of card games, such as poker, blackjack and baccarat, are played. Some card games have gaming schemes to allow players to carry out so-called squeezing tactics. Here, the term “squeezing”, which may be alternatively referred to as “peeking”, means an act of looking deliberately and slowly at faces of face-down cards in part, by raising corners or edges thereof slightly, and without removing them from the table. By squeezing, one player can know a tip of the card in part without informing the other players. This tactics produces prominent mental effects on the other players and hence increases entertainment and enjoyment of the games.

SUMMARY OF THE INVENTION

An object of the present invention is to provide a gaming device having a card game, in which a player may enjoy squeezing tactics, and a method for display control therein.

According to a first aspect of the present invention, a gaming device having a card game using a card set is provided with: an input device configured to receive an input by a player; a display device configured to display one or more cards selected from the card set in any of face-up and face-down states; a controller configured to control the display device to show a face of a target card selected from the cards in the face-down state in part to an extent determined by the input.

According to a second aspect of the present invention, a gaming device having a card game using a card game is provided with: a main controller configured to determine a target card from the card set and generate a data to specify the target card; and a player's terminal configured to receive the data from the main controller, the terminal including; an input device configured to continuously receive inputs by a player to update a squeezing value; and a display device configured to display the target card specified by the data in a face-down state and show a face of the target card in part to an extent determined by the squeezing value.

Preferably, the player's terminal is configured to store an orientation data continuously updated by the inputs and the display device is configured to display the target card in an orientation specified by the orientation data.

More preferably, the input device includes a touchscreen superposed on the display device.

According to a third aspect of the present invention, a method for display control in a gaming device having a card game using a card set is provided with accepting a data to specify a target card from the card set; receiving an input from a player to update a squeezing value; and displaying the target card in a face-down state with showing a face of the target card in part to an extent determined by the squeezing value.

Preferably, the method is further provided with: updating an orientation data by the input; and displaying the target card in an orientation specified by the orientation data.

DETAILED DESCRIPTION OF THE PREFERRED EMBODIMENT

Throughout the specification, the appended drawings and claims, several terms are defined and used in accordance with the following definitions. The term “card” means not only a virtual card but also an image of a card on a display. The terms “face-up” and “face-down” with respect to the card should not be necessarily interpreted as such spatial orientations. When the card has a tip merely on one face thereof, the term “face-up” means showing the face having the tip entirely, and the term “face-down” means hiding the face having the tip entirely or partly. When the card is an image on a display, the term "squeeze" means to make the display indicate a part of a face of a face-down card under control of the player.

An embodiment of the present invention will be described hereinafter with reference to the appended drawings.

-1: Appearance of a Gaming Device-

Figure 1:
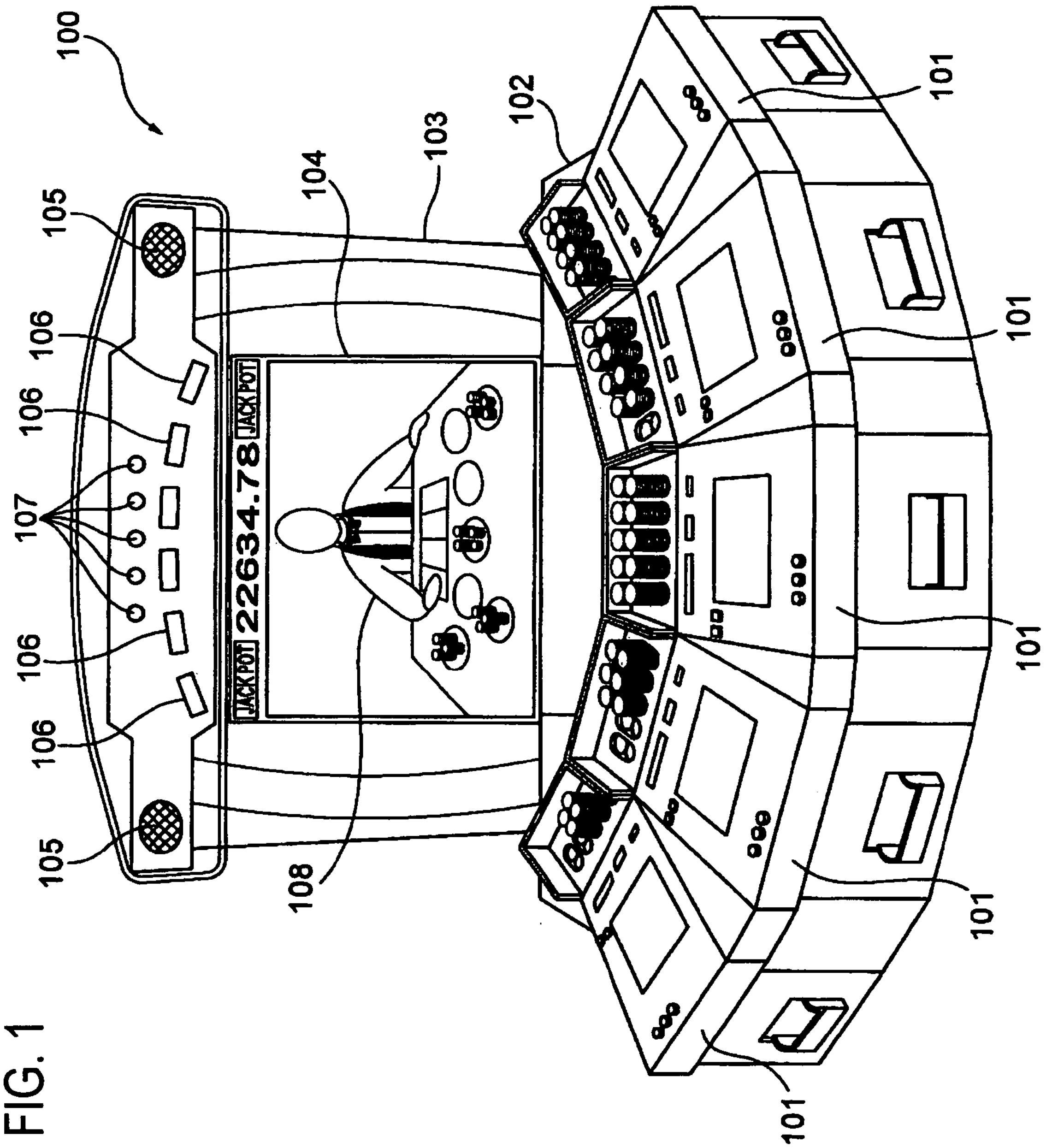
FIG. 1 is a perspective general view of a gaming device in accordance with an embodiment of the present invention.

Referring to FIG. 1, a gaming device 100 has a table portion 102 in which a plurality of player's terminals 101 referred to as satellites are substantially radially arranged, and a panel portion 103 arranged at the rear of the table portion 102. FIG. 1 shows an example of five player's terminals 101 arranged radially around the panel portion 103 as a center.

The panel portion 103 has a host display 104 which is a display device such as a LC (Liquid-Crystal) display device, speakers 105, lamps 106 and LEDs 107. The host display 104 indicates information of the whole of the game, in which players operating the player's terminals 101 participate, to each of the players in common. The host display 104 is configured to display animations to indicate beginning of the term for allowing betting, closing betting, and determination of win or lose to the players.

Figure 2:
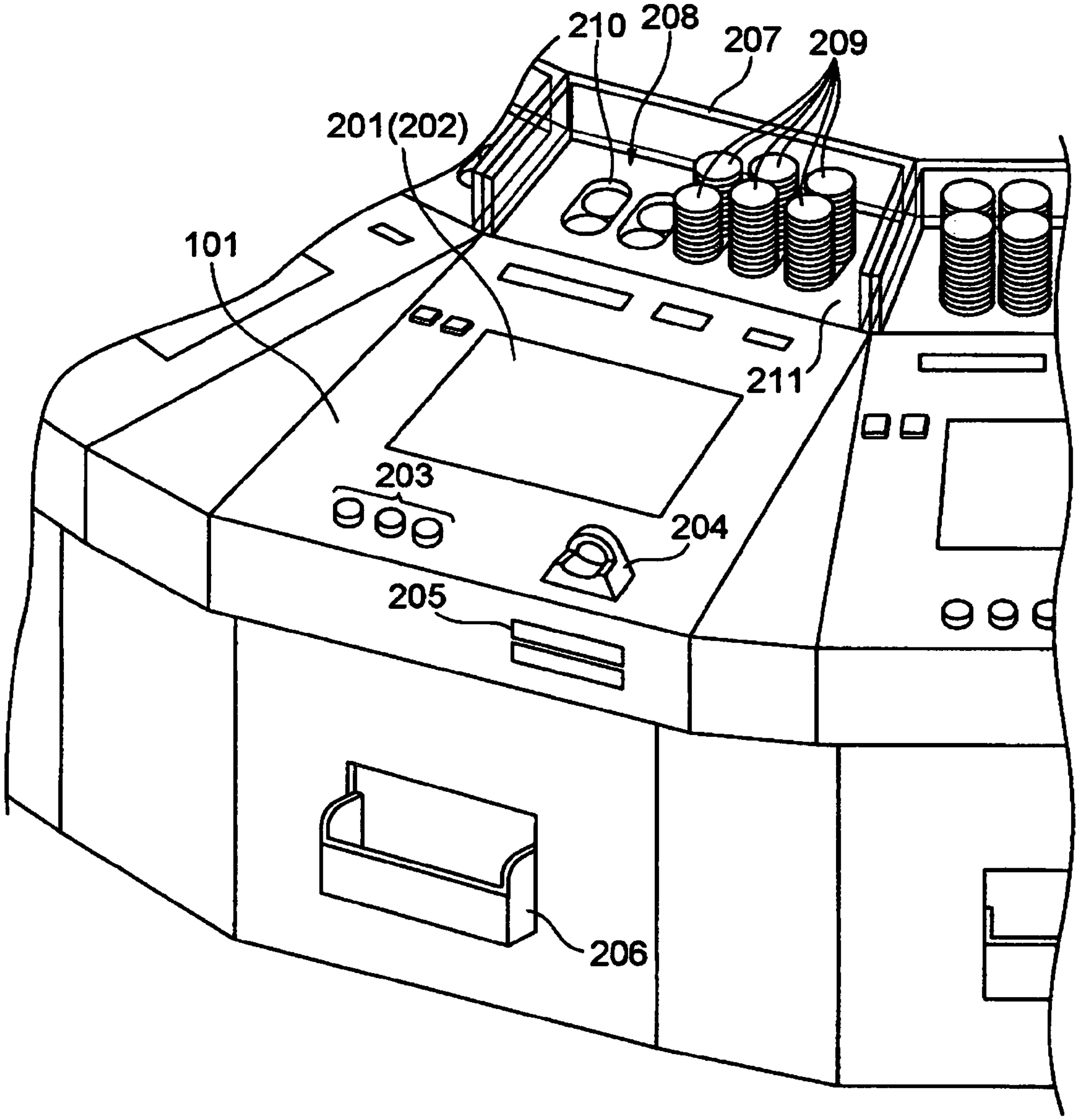
FIG. 2 is a perspective view of a player's terminal of the gaming device.

Referring to FIG. 2, each of the player's terminals 101 has a LC display 201 for individually providing information with respect to the game for the player on an upper face thereof. A transparent touchscreen 202 covers the LC display 201 so as to cooperate with images, such as button images, on the LC display 201, thereby the player is invited to input any commands. On the side toward the player of the LC display 201, a button group 203 including plural buttons, such as a PAYOUT button and a BET button, which the player uses in the game, are arranged. On the right of the button group 203, a coin slot 204 where the player inserts playing value media, such as coins, medals or chips, (simply, "coins" hereinafter) is provided. Below the coin slot 204, a bill acceptor 205 where the player inserts bills is provided. Inside the coin slot 204, a coin sensor (not shown) is arranged so as to detect insertion of coin(s) and output coin detection signal(s) to the player's terminal 101. Inside the bill acceptor 205, a bill sensor (not shown) is arranged so as to detect insertion of bill(s) and output bill detection signal(s) to the player's terminal 101.

A coin payout tray 206 is provided below the player's terminal 101. When the player pushes down the PAYOUT button of the button group 203, coins, the number of which is correspondent to all or a part of a credit value memorized in the player's terminal 101, are discharged to the payout tray 206 to fall into the player's hand.

A panel 207 made of transparent acrylic resin is arranged to form a angular U-shape on the opposite side to the player of the LC display 201 (on the side facing to the panel portion 103). A region enclosed with the panel 207 provides a presentation portion 208 for presenting a dummy chip 209. The presentation portion 208 is provided with a dummy chip 209, a presentation plate 211 having an opening 210 for retractably protruding the dummy chip 209 over the upper face of the player's terminal 101, and an elevator (described later) for elevating and letting down the dummy chip 209.

The dummy chip 209 is a dummy of a mountain of chips and formed from any resin or such. The presentation portion 208 may have a plurality of dummy chips 209, which are respectively composed of different units. For example, one imitates one credit, another imitates ten credits and the other imitates hundred credits.

The dummy chip 209 is made to controllably ascend and descend by the elevator depending on the number of chips which the player operating the player's terminal credits to the gaming device 100, namely a possessing credit value. For example, given that the player possesses the possessing credit value of "251", a first dummy chip 205 imitating one credit is made to ascend to protrude from the presentation plate 211 by a height of one chip, a second dummy chip 205 imitating ten credits by a height of five chips, a third dummy chip 205 imitating hundred credits by a height of two chips.

All players can immediately and intuitionally grasp the possessing credit value of the player by looking at the heights of the dummy chips 209 projecting from the presentation plate 211. More specifically, the dummy chips 209 provide realistic sensation as if real chips go on increasing or decreasing in front of the player.

Figure 3:
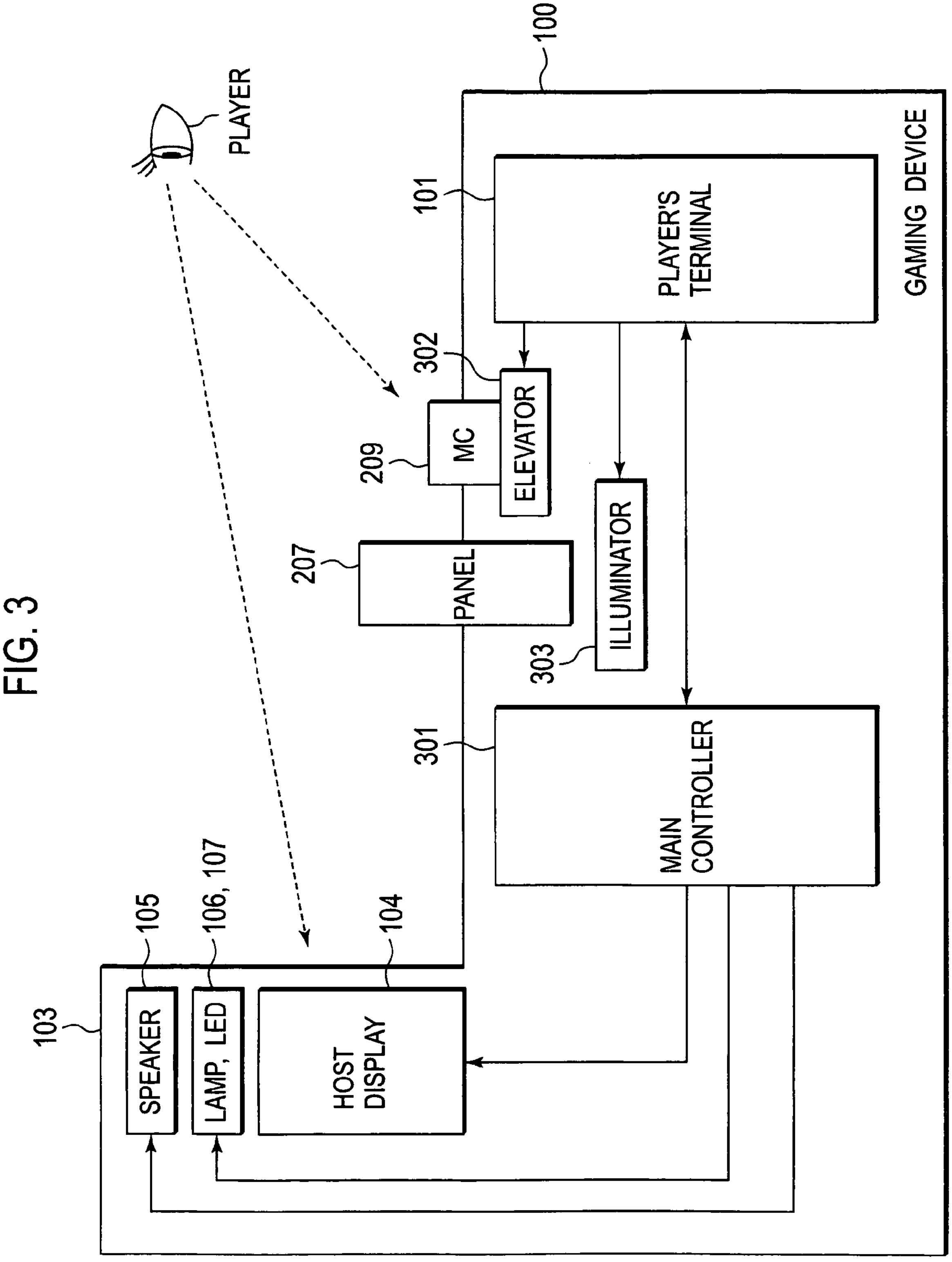
FIG. 3 is a block diagram of a control system of the gaming device.

Referring to FIG. 3, the gaming device 100 houses a main controller 301. The main controller 301 is composed of data processors and peripheral devices, both for executing a gaming program. The main controller 301 is linked with the respective player's terminals 101 so as to be capable of bi-directional communication. Thereby, the main controller 301 receives notification of selections of the respective players, such as numbers of betted chips and betting subjects, begins execution of the game when predetermined conditions are fulfilled, determines whether win or lose, and informs the respective players of the results. The respective player's terminals 101 carry out increment or decrement of the possessing credit values of the respective players in accordance with notification from the main controller 301. For example, if one player wins the game, the correspondent player's terminal 101 adds the number of winning credits to his possessing credit value and re-store the value, and, if another player loses the game, the correspondent another player's terminal 101 reduces the number of losing credits to his possessing credit value and re-store the value.

The main controller 301 also carries out the other functions of signal output for images to be displayed on the host display 104, control of the lamps 106 and the LEDs 107, and control of the speakers 105.

Each of the player's terminals 101 links with an elevator 302 and an illuminator 303. The elevator 302 is means for making the dummy chips 209 ascend and descend, and uses a stepping motor as its motive source in accordance with the present embodiment, however, an ordinary motor in combination with a position regulation mechanism may be applied thereto.

Figure 4:
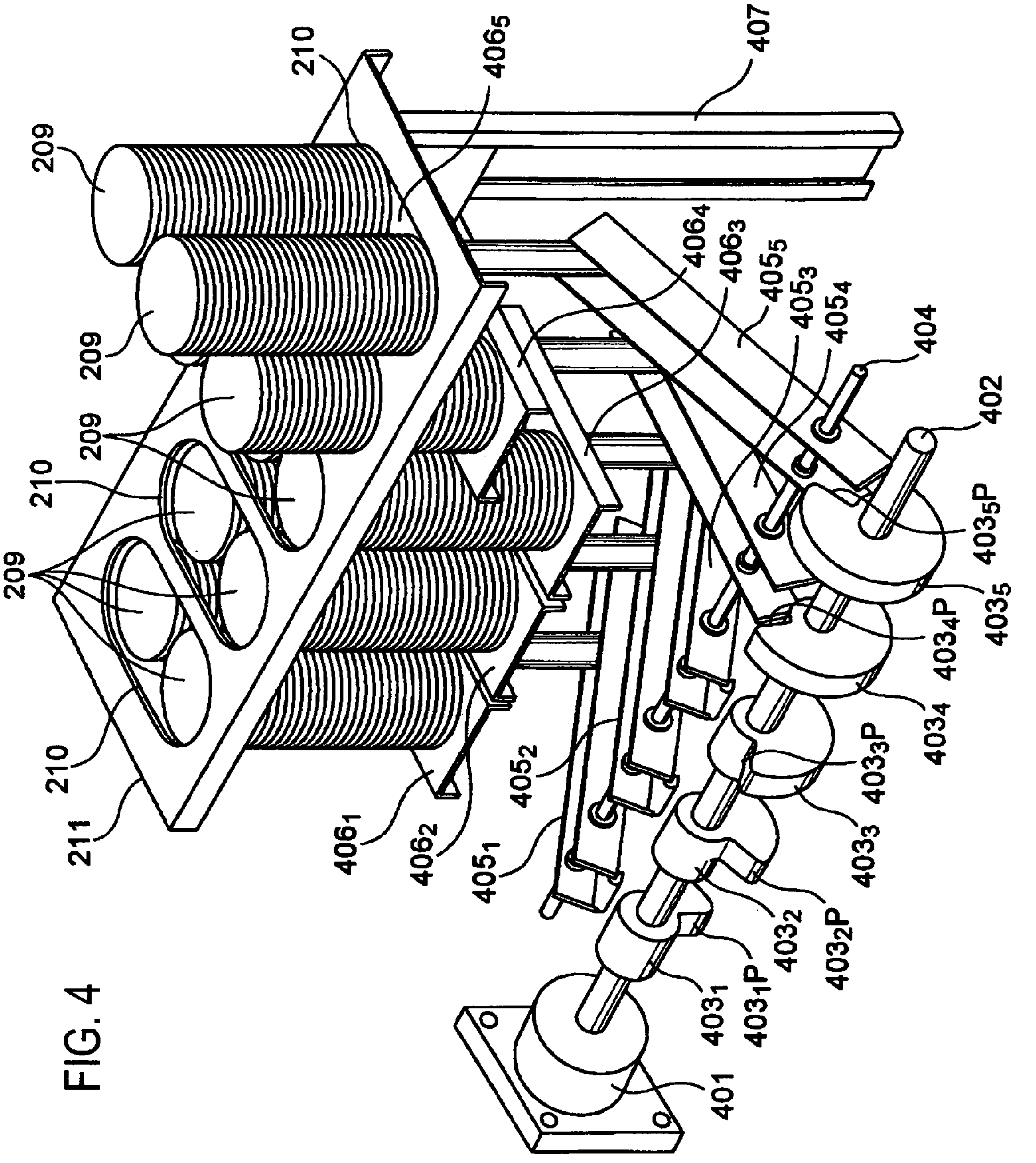
FIG. 4 is a perspective view showing an example of an elevator applied to the gaming device.

Referring to FIG. 4, the elevator 302 has a driving shaft 402 drivingly attached to the stepping motor 401, cams $\mathbf{403}_1$-$\mathbf{403}_5$ drivingly fixed to the driving shaft 402 so as to rotate together, arm portions $\mathbf{405}_1$-$\mathbf{405}_5$ swingably pivoted on a support shaft 404 so that one ends thereof respectively abut on steps $\mathbf{403}_1$P-$\mathbf{403}_5$P formed on profiles of the cams $\mathbf{403}_1$-$\mathbf{403}_5$, and trays $\mathbf{406}_1$-$\mathbf{406}_5$ respectively attached on other ends of the arm portions $\mathbf{405}_1$-$\mathbf{405}_5$. The dummy chips 209 are respectively fixedly placed on the trays $\mathbf{406}_1$-$\mathbf{406}_5$. The trays $\mathbf{406}_1$-$\mathbf{406}_5$ are respectively guided along sliding rails 407 so that the dummy chips 209 regularly pass through the openings 210.

In accordance with the example shown in FIG. 4, to make five kinds of the dummy chips 209 ascend and descend, the cams $\mathbf{403}_1$-$\mathbf{403}_5$, the steps $\mathbf{403}_1$P-$\mathbf{403}_5$P, the arm portions $\mathbf{405}_1$-$\mathbf{405}_5$, and the trays $\mathbf{406}_1$-$\mathbf{406}_5$ are respectively provided by five. They are correspondently numbered subscript 1 to 5 to be distinguished, however, these subscript numbers will be omitted hereinafter if not required to be distinguished. For example, they are simply referred to as the cam(s) 403, the step(s) 403P, the arm portion(s) 405, and the tray(s) 406.

Next, operations of the elevator 302 shown in FIG. 4 will be described hereinafter.

When the stepping motor 401 operated by the player's terminal 101 rotates the driving shaft 402, the cams 403 consequently rotate. Progress of this rotation causes that one of the steps 403 abuts on one end of one of the arm portions 405. Meanwhile, in accordance with the present embodiment, the step $403_5$P first abuts on one end of the arm portion $405_5$, subsequently the step $403_4$P, $403_3$P, $403_2$P and $403_1$P do the same on one ends of the arm portions $405_4$, $405_3$, $405_2$ and $405_1$ in this order.

When the step 403P further rotates after abutting on one end of the arm portion 405, the step 403P presses down the end of the arm portion 405. By being pressed down, the arm portion 405 swings around the support shaft 404 so that the opposite end leaps up. Consequently, the tray 406 attached to the opposite end ascends and the dummy chip 209 placed on the tray 406 also ascends. As a result, depending on the amount of rotation of the driving shaft 402 by the stepping motor 401, a part of or the whole of the dummy chip 209 may be made to pass through the opening 210 to project and be exposed over the presentation plate 211 by a controlled height.

Further, by rotating the stepping motor 401 in the reverse direction, apart of or the whole of the dummy chip 209 projecting and being exposed over the presentation plate 211 may be controllably retracted below the presentation plate 211.

In accordance with the example shown in FIG. 4, since the cams $403_1$-$403_5$ are so dimensioned that the steps $403_1$P-$403_5$P abut on one ends of the correspondent arm portions 4051-4055 in the order from the right to the left in this drawing, the dummy chip 209 in the most right first starts to ascend and the dummy chips 209 at the next consequently start to ascend in the order from the right to the left. If value-per-chips are distinguished among the plurality of dummy chips 209 by, for example, colors or patterns, the heights of the dummy chips 209 on the whole can express a wide range of possessing credit values. One preferable example is that the value-per-chips increases by digits from the most right one to the most left one, as 1, 10, 100, 1000 credits. Of course, the other various examples such as 1, 2, 5, 10, 20 credits or such may be also preferable.

Figure 5:
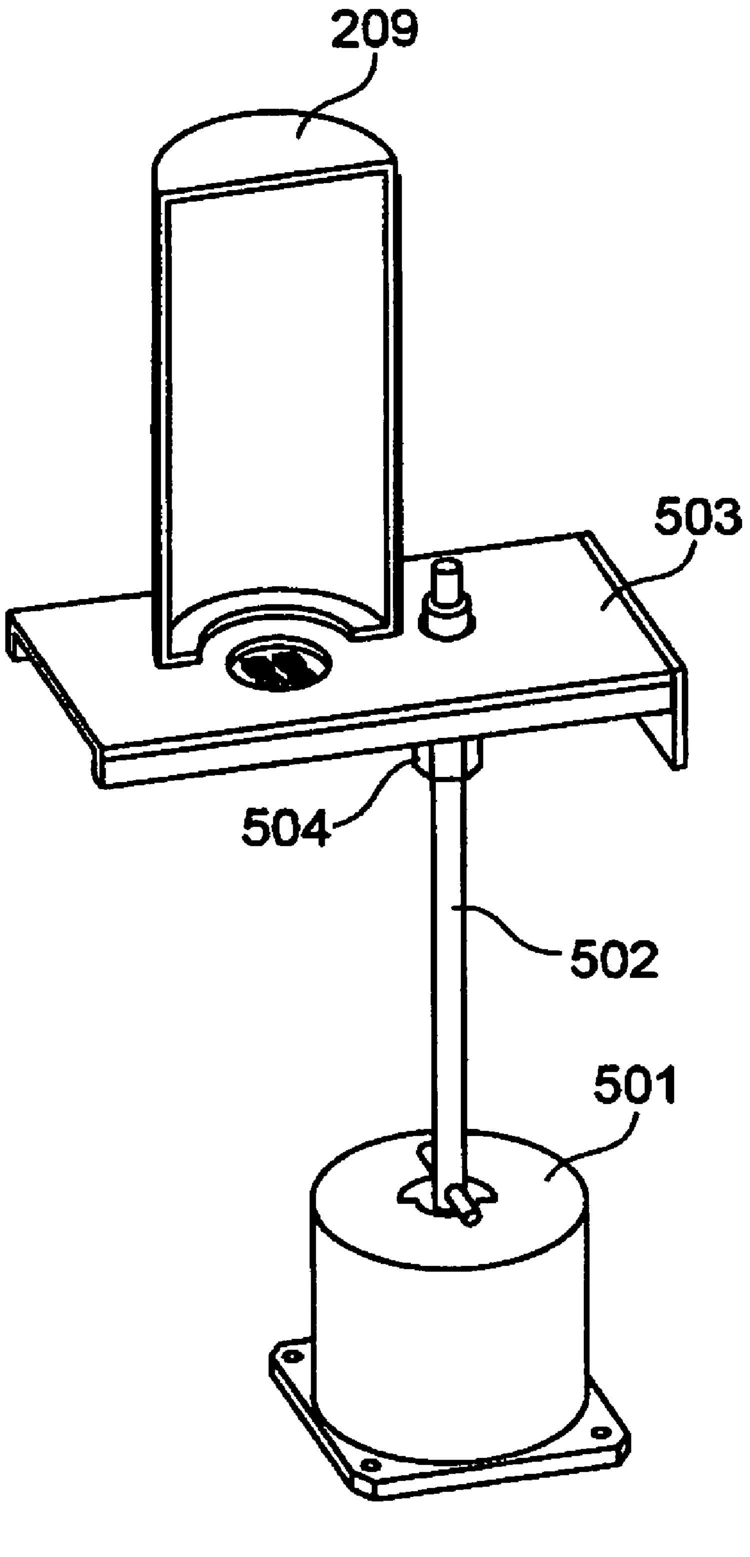
FIG. 5 is a perspective view showing another example of the elevator.
Figure 6:
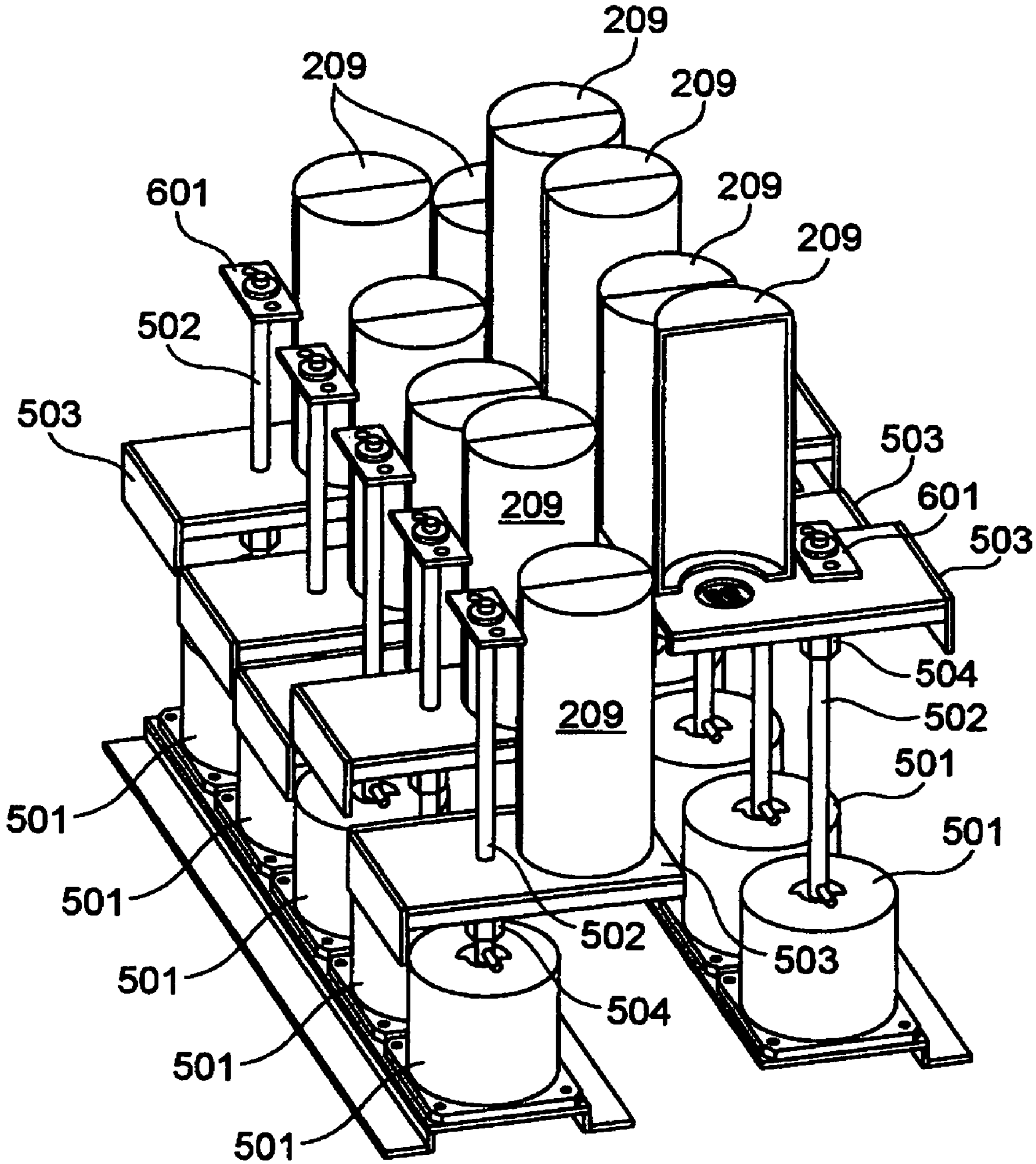
FIG. 6 is a perspective view showing the other example of the elevator.

The elevator 302 may be alternatively constituted as in FIG. 6 by assembling a plurality of basic units of another example, each shown in FIG. 5.

Each of the basic units of the elevator 302 is constituted so that a tray 503 is attached to a driving shaft 502 drivingly rotated by a stepping motor 501.

A dummy chip 209 is placed on the tray 503 as similar to the aforementioned. The dummy chip 209 in accordance with this example is formed from a pair of half tubular cylinders adhered with each other and FIG. 5 illustrates one half thereof before being adhered. The dummy chip 209 in accordance with the present example may be made to pass through the opening 210 to project and be exposed over the presentation plate 211 by a controlled height as similar to the aforementioned example.

The tray 503 has a nut 504 tightened on the bottom surface thereof. A periphery of the driving shaft 502 is threaded and screwed with the nut 504.

The tray 503 is restricted not to rotate with rotation of the driving shaft 502 by, for example, a guiding rail (not restricted in the vertical direction) or contact with an inner wall of the gaming device 100.

Since the nut 504 is fed forward and rearward by rotation of the screwed driving shaft 502, the tray 503 and the dummy chip 209 thereon can be controllably made to ascend and descend by regulation of rotation of the stepping motor 501.

Referring to FIG. 6, the elevator 302 in accordance with the present other example is provided with a row of five of the basic units, on each of which one dummy chip 209 is placed, and another row of five of the basic units, on each of which one dummy chip 209 placed. Since the basic units respectively have the stepping motors 501, the dummy chips 209 may be independently made to ascend and descend under control.

In a case where the present elevator 302 is used, the dummy chips 209 can be used not only for expressing the possessing credit value but also for gimmicky action such as a wave in a special case, for example when the player gets a big win.

Returning to FIG. 3, the player's terminal 101 is linked with the illuminator 303 to control light emission of the illuminator 303. The illuminator 303 includes a circuit having a plurality of light sources such as LEDs and is configured to emit light of various colors (such as red, blue, green, white and such) with controllable brightness. The light emitted from the illuminator 303 is conducted via the panel 207 and emitted out of the gaming device 100 to, in particular, where is visible to the player.

-1.1 A Version of the Main Controller-

Figure 7:
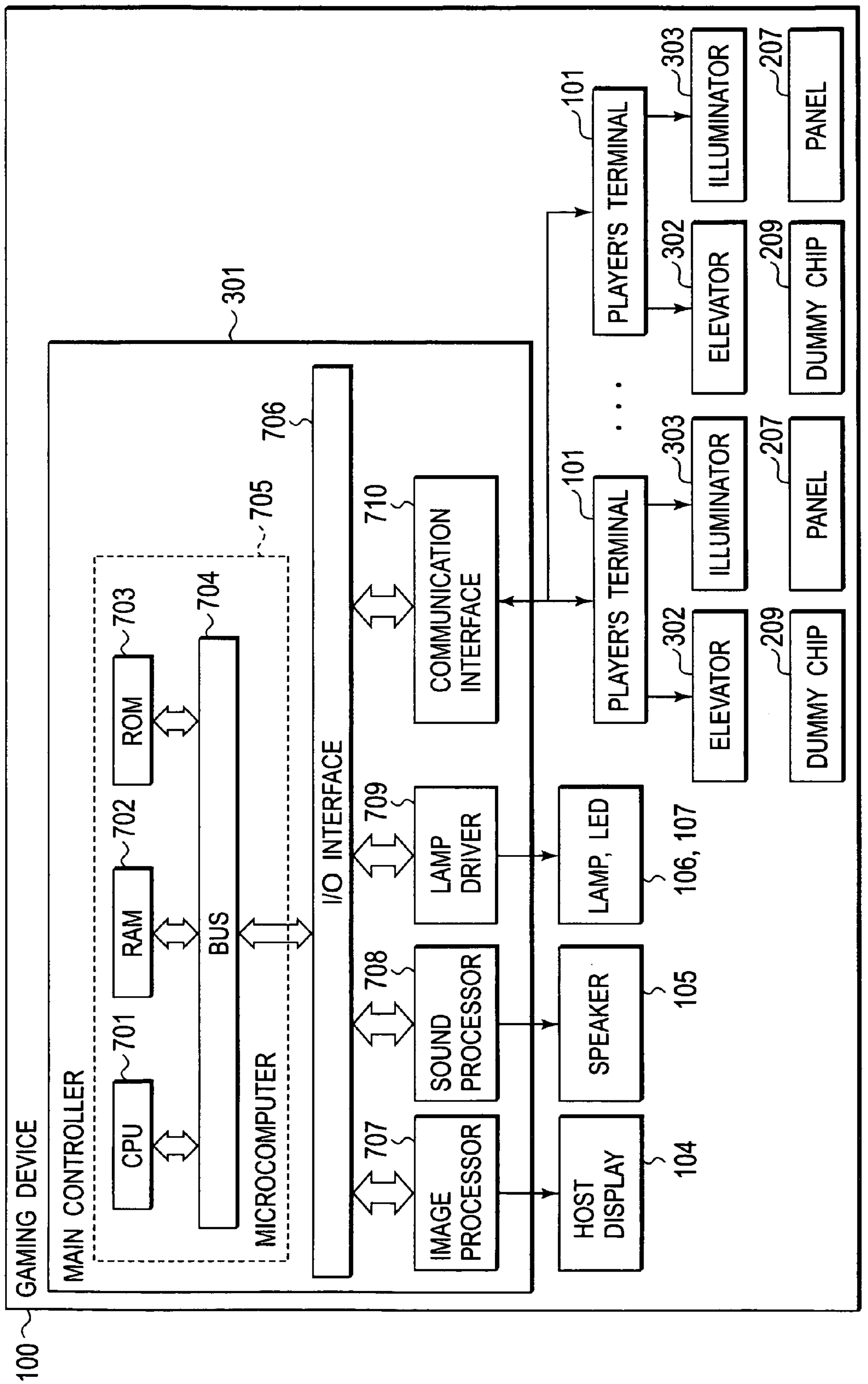
FIG. 7 is a functional block diagram showing an example of a constitution of a main controller applied to the gaming device.

A version of the main controller 301 will be described hereinafter with reference to FIG. 7.

The main controller 301 is provided with a microcomputer 705 consisting essentially of CPU 701, RAM 702, ROM 703 and a bus 704 for data communication among these elements. The ROM 703 stores various programs for processing required for control of the gaming device 100, and a data table or such. The RAM 703 is a memory for temporarily storing various data processed or to be processed by the CPU 701.

The microcomputer 705 is linked with an image processor 707 via an I/O interface 706. The image processor 707 is configured to drive the host display 104.

The image processor 707 is composed of a program ROM, an image ROM, an image controller CPU, a working RAM, a VDP (Video Display Processor), a video-RAM and such. The program ROM stores an image control program and various selection tables with respect to display on the host display 104. The image ROM stores bitmap data for forming images on the host display 104 and such. The image controller CPU is configured to select and determine an image to be displayed on the host display 104 from the bitmap data stored in the image ROM in advance on the basis of parameters set by CPU 701 and in accordance with the image control program stored in the program ROM in advance. The working RAM serves as temporary memory means at a time of executing the image control program at the image controller CPU. The VDP is configured to generate image data according to display contents determined by the image controller CPU and output them to the host display 104. The video-RAM serves as temporary memory means at a time of forming images at the VDP.

Further, the microcomputer 705 is controllably linked with a sound processor 708 to generate output sound signals applied to sounds for various sound effects, BGMs and such for direction and drive the speaker 105.

Further, the microcomputer 705 is controllably linked with a lamp driver 709 to generate illumination signals for direction and make the lamps 106 and the LED 107 arranged in front of the gaming device 100 illuminate.

The microcomputer 705 is linked with the respective player's terminals 101 via the communication interface 710 so as to establish interactive communication among the CPU 701 and the player's terminals 101. The CPU 701 is configured to transmit and receive command and requests with the respective player's terminals 101 via the communication interface 710 so that the main controller 301 and the player's terminals 101 cooperatively proceed with and control the game.

-1.2 A Version of the Player's Terminal-

Figure 8:
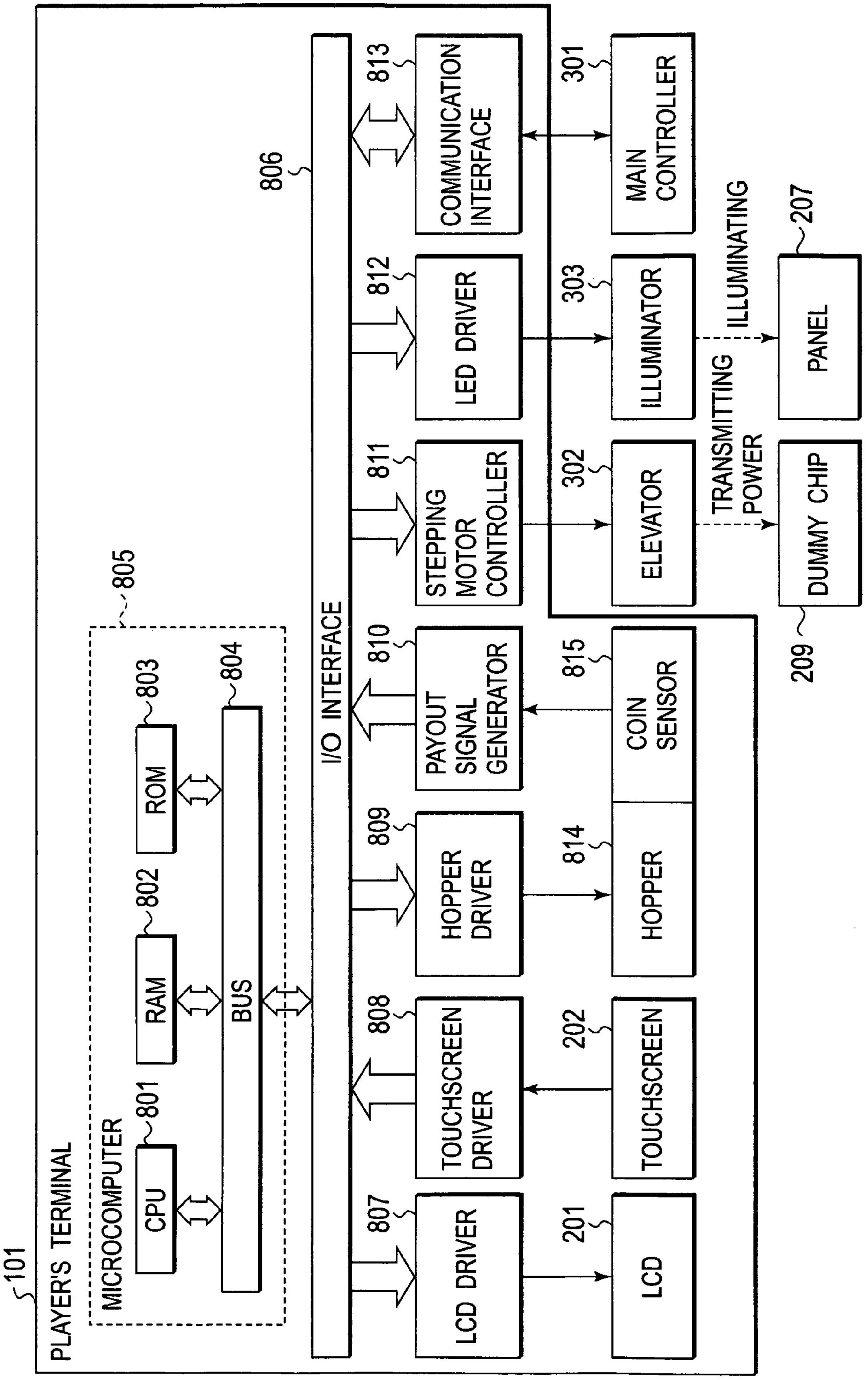
FIG. 8 is a functional block diagram showing an example of a constitution of a player's terminal applied to the gaming device.

Next, a version of the player's terminal 101 will be described hereinafter with reference to FIG. 8.

A version of the player's terminal 101 will be described hereinafter with reference to FIG. 7.

The player's terminal 101 is provided with a microcomputer 805 consisting essentially of CPU 801, RAM 802, ROM 803 and a bus 804 for data communication among these elements. The ROM 803 stores various programs for processing required for control of the player's terminal 101, for example control of operation of the elevator 302, illumination and light-off of the illuminators and such, and a data table or such. The RAM 803 is a memory for temporarily storing various data processed or to be processed by the CPU 801.

The microcomputer 805 is linked with an LCD driver 807 via an I/O interface 806. The LCD driver 807 is configured to drive the LC display 201.

The microcomputer 805 is linked with a hopper driver 809 to drive a hopper 814. When the microcomputer 805 outputs driving signals to the hopper driver 809, the hopper 814 is driven to pay out a predetermined number of coins to the coin payout tray 206. The microcomputer 805 is further linked with a coin sensor 815 via a payout signal generator 810. The coin sensor 815 is arranged inside the coin payout tray 206. When the coin sensor 815 detects that the predetermined number of coins are finished to be paid out, the coin sensor 815 outputs a signal to the payout signal generator 810. Based on this situation, the payout signal generator 810 outputs a payout termination signal to the microcomputer 805.

The microcomputer 805 is linked with a stepping motor controller 811 to drive the stepping motor 401 (or 501) for actuating the elevator 302. When the microcomputer 805 outputs signals to the stepping motor controller 811, the stepping motor controller 811 drives the stepping motor 401 (or 501) to rotate. Thereby, the elevator 302 is actuated to make the dummy chip 209 ascend or descend.

Further, the microcomputer 805 is linked with a LED driver 812 to operate the illuminator 303. In accordance with the present embodiment, the illuminator 303 includes a plurality of LEDs and the LED driver 812 selectively supplies electric power to LEDs subject to a command from the microcomputer 805 among all the LEDs under control by the command from the microcomputer 805. Thereby, the LEDs are subject to controlled illumination and light-off under control of the microcomputer 805 in a desired condition.

In accordance with the present embodiment, the illuminator 303 includes five red LEDs, five blue LEDs, and five white LEDs. The LED driver 812 is configured to selectively supply electric power to these five red LEDs, the five blue LEDs, and the five white LEDs independently.

Further, the microcomputer 805 is linked with the main controller 301 via a communication interface 813 so as to establish interactive communication between the microcomputer 805 and the main controller 301. The microcomputer 805 is configured to transmit and receive commands and requests with the main controller 301 via the communication interface 813 so that the microcomputer 805 and the main controller 301 cooperatively proceed with and control the game.

Figure 9:
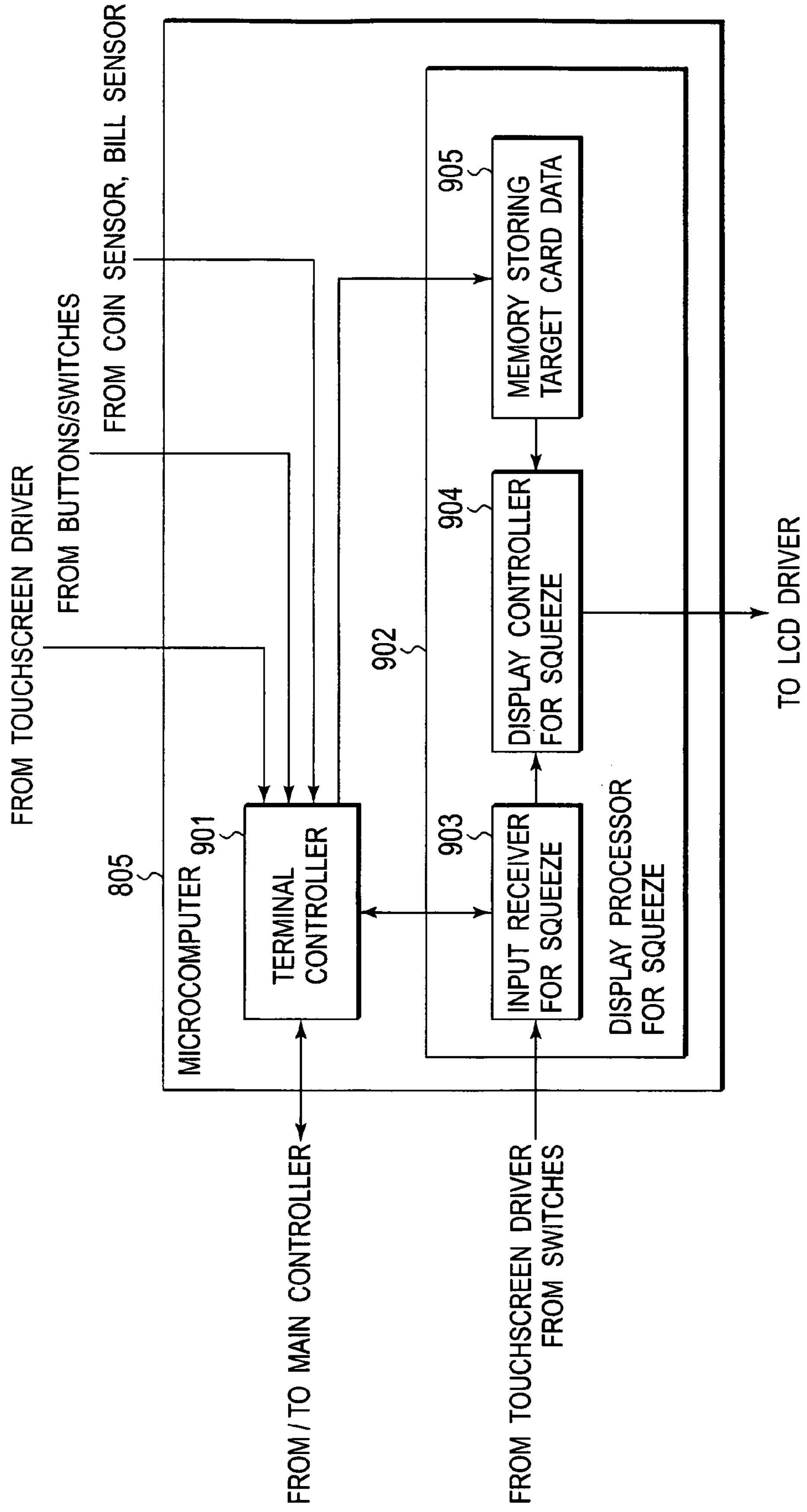
FIG. 9 is a functional block diagram of a microcomputer of the player's terminal.

Referring to FIG. 9, the microcomputer 805 also manages display control for squeezing. The microcomputer 805 has a terminal controller 901 and a display processor 902 for squeezing. The display controller 902 is composed of an input receiver 903 for squeezing, a display controller 904 for squeezing, and a memory 905 storing target card data.

The terminal controller 901 is configured to receive inputs from the player through the touchscreen 202 via a touchscreen driver 808 and any other button switches, and notify the received inputs from the player to the main controller 301. The inputs include data for a subject of betting (whether the banker, the player, or the tie) and a number of bets.

The terminal controller 901 receives data indicating cards dealt by the main controller 301. For example, the main controller 301 determines a target card subject to squeezing, which is to be displayed as a dealer's card in a face-down state, and transmit data for specifying the target card (for example, a suit (one of spades, hearts, diamonds and clubs) and a rank (a number between 2 and 10, or one of jack, queen, king and ace)) to the player's terminal 101. The main controller 301 may be controlled to limit the transmission so that only one terminal, the player of which inputs the highest betting value in the current round of the game, receives the data specifying the target card.

Upon receiving the data specifying the target card, the terminal controller 901 included in the player's terminal 101 writes the data specifying the target card on the memory 905 so as to be stored.

The input receiver 903 receives inputs with respect to card squeezing from the player by detecting operation of the touchscreen 202 provided in the player's terminal and the button switches, and manages a squeezing value in accordance with the inputs to be stored, where the squeezing value is a data used to control of an extent of squeezing the target card. In accordance with the present embodiment, the squeezing value falls in a range from 0 to a predetermined maximum value (for example, 50). When the squeezing value is 0, the card is displayed to be completely face-down. When the squeezing value is 50, the card is displayed to indicate the face to a maximum extent predetermined in advance.

When the player carries out operation to give inputs for increments on the squeezing value ("increment operation", hereinafter), the input receiver 903 adds one on the stored squeezing value for each one increment operation. For example, given that the currently stored squeezing value is 10, the squeezing value will be changed to be 11 upon one increment operation and stored in the memory 905.

When the player carries out operation to give inputs for decrements on the squeezing value ("decrement operation", hereinafter), the input receiver 903 subtracts one from the stored squeezing value for each one decrement operation.

Further, the input receiver 903 is configured to receive inputs with respect to orientation of the card from the player. For example, the player may select any of lengthwise and crosswise orientations and the input receiver 903 is configured to receive an input specifying the selected orientation and makes the display controller 904 display the card in the correspondent orientation.

The display controller 904 accepts notification of the orientation and the squeezing value of the card to generate image data for display of card squeezing and output them to the LC display driver 807. Consequently, the LC display 201 included in the player's terminal 101 displays the target card in a face-down state to show a face thereof in part to an extent determined by the squeezing value upon the inputs by the player.

Next, an example of the operation of the display processor 902 for squeezing will be described hereinafter with reference to FIGS. 10A and 10B.

The main controller 301 transmits a command for starting display processing for squeezing to one of the player's terminal 101 to be subject if predetermined conditions are met.

Figure 10A:
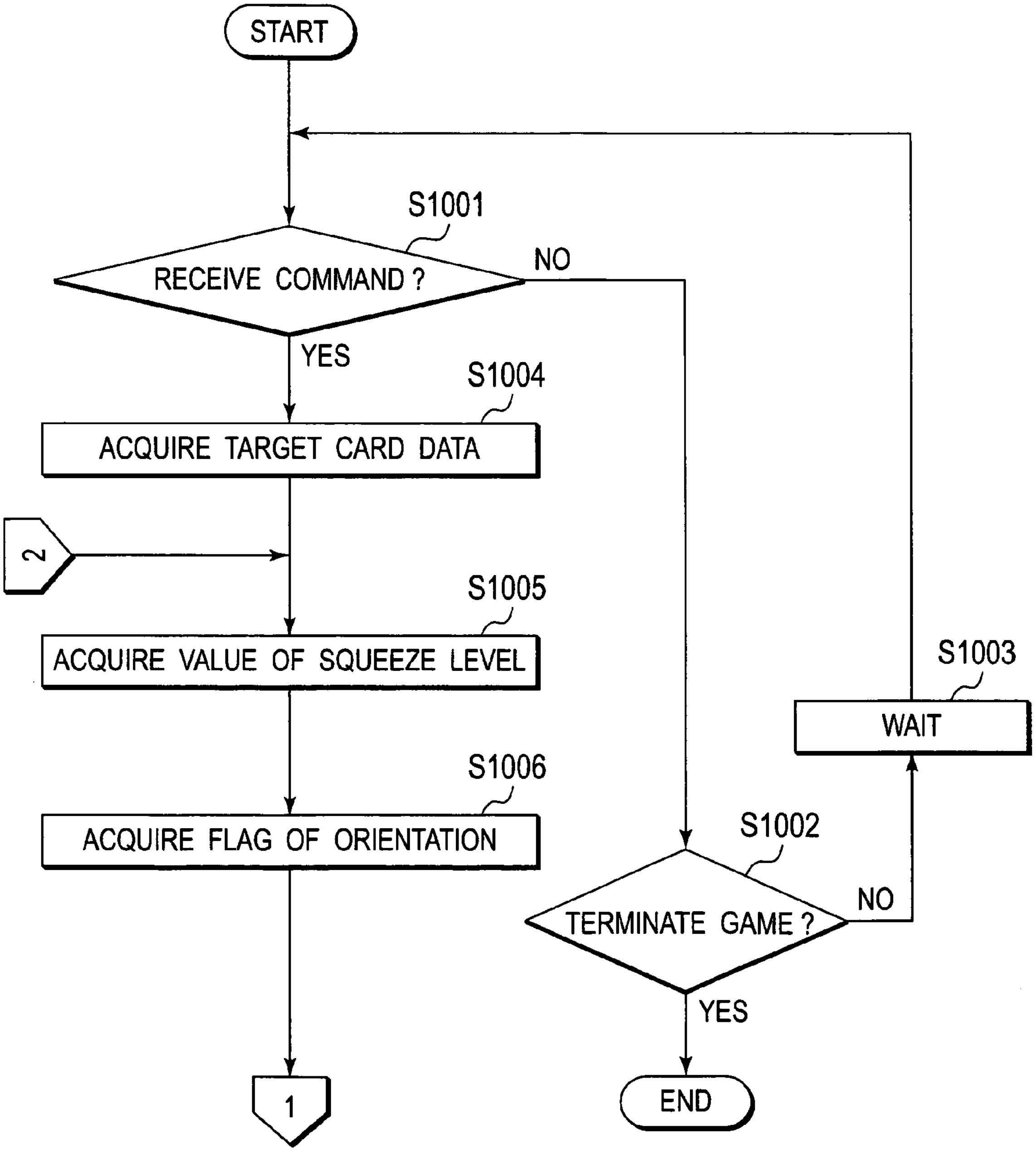
FIG. 10A is a flow chart illustrating operations of a display processor for squeezing of the microcomputer.

The display processor 902 decides whether the display processor 902 has received the command for starting display processing for squeezing (see S1001 in FIG. 10A). If the command has not been received (No at S1001), the display processor 902 further decides whether a condition for terminating the game is met. If the condition is met (Yes at S1002), the display processor 902 proceeds with no treatment and finishes the display processing for squeezing. On the contrary, if the condition is not met (No at S1002), the display processor 902 decides the display processor 902 has received the command for starting display processing for squeezing again (S1001) after wait for a predetermined period (for example, 3 seconds).

At the step of S1001, if the command has been received (Yes at S1001), the display processor 902 acquires the data specifying the target card (S1004). The data specifying the target card is notified by the main controller 301 to be stored in the memory 905 and is read out to the display processor 902.

Next, the display processor 902 acquires the squeezing value (S1005). The squeezing value is stored in the input receiver 903 and subject to the increment operation and the decrement operation by operations to the touchscreen 202 and/or the buttons 203. The player may carry out the increment operation to look at the face of the target card to a greater extent and the decrement operation to recover the target card in the face-down state.

Next, the display processor 902 acquires a flag specifying the orientation of the card (S1006). The flag is applied to specifying the orientation where the card is squeezed from, whether lengthwise or crosswise. For example, if the flag is 0, the display processor 902 displays the card to be squeezed in the lengthwise orientation, and if the flag is 1, the display processor 902 displays the card to be squeezed in the crosswise orientation. The flag specifying the orientation of the card stored in the input receiver 903 and subject to being switched by operations to the touchscreen 202 and/or the buttons 203.

Figure 10B:
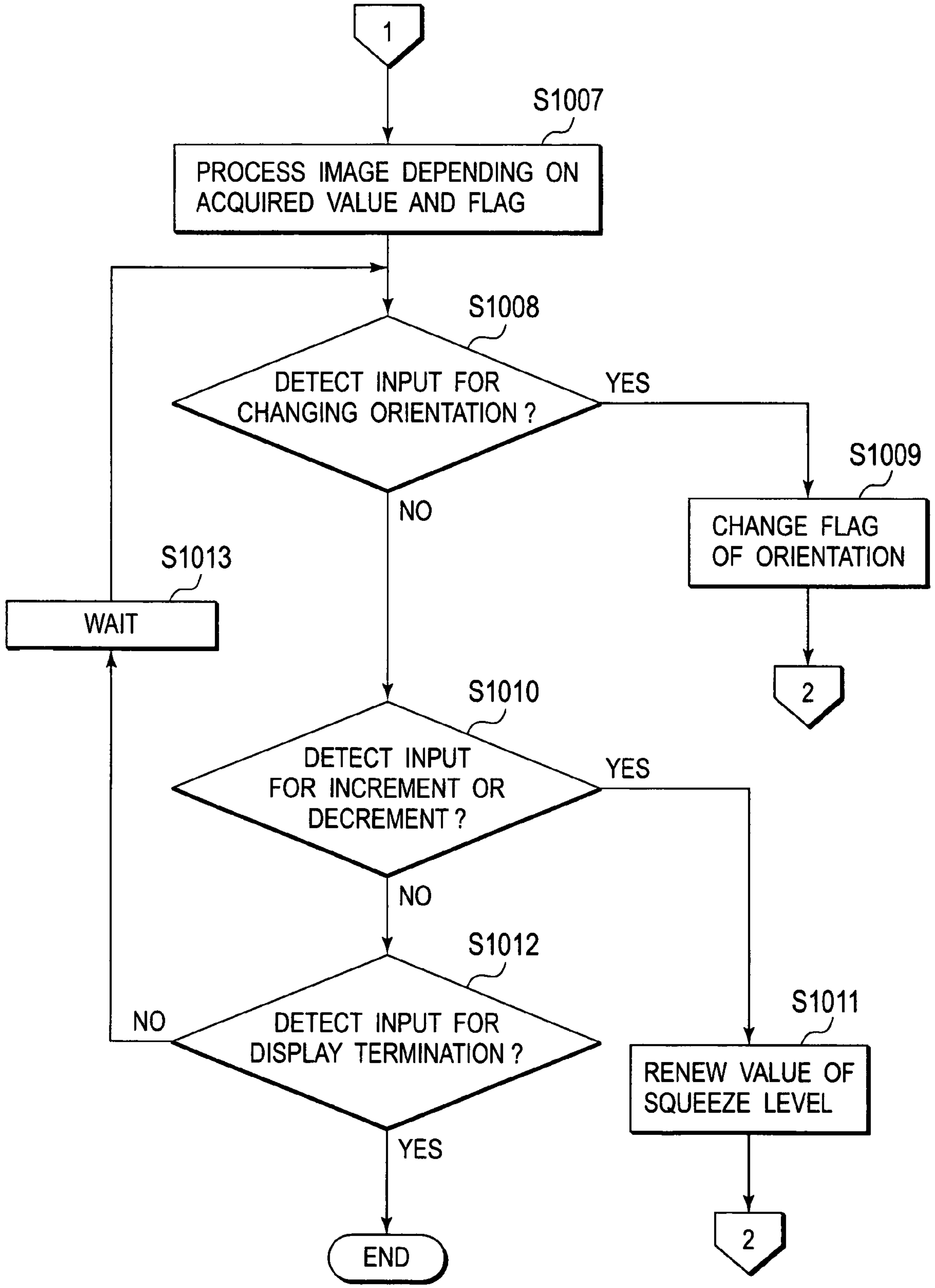
FIG. 10B is a flowchart illustrating operations subsequent to the operations illustrated in FIG. 10A.

Next, the display processor 902 proceeds with image processing of the target card upon the squeezing value and the flag specifying the orientation (S1007 in FIG. 10B). More specifically, the display processor 902 of the display controller 904 generates image data of the target card upon the squeezing data and the flag specifying the orientation and outputs them to the LCD driver 807.

The display controller 904 may be configure to store all image data respectively prepared to squeezing values and suits and ranks of cards to output the correspondent data upon the acquired squeezing value, or alternatively store merely basic image data and carry out operation such as cooperation transformation operation upon the acquired squeezing value so as to generate and output an image data in a state of squeezing the card.

FIGS. 11 through 13 illustrate examples of images on the LC display 201 by the image processing of S1007.

Figure 11A:
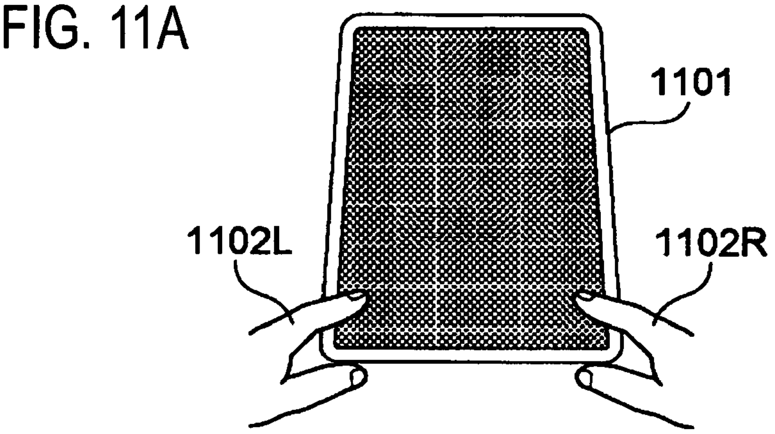
FIGS. 11A through 11C illustrate examples of images on a display of the player's terminal in the course of a display process for squeezing.

FIG. 11A is an example of a case where the flag specifying the orientation specifies to be lengthwise and the squeezing value is 0. In this example, the target card 1101 is displayed to be face-down entirely and the face thereof is not shown. Meanwhile, finger images 1102L and 1102R imitating fingers of the player are displayed at both sides of the target card 1101. The finger images 1102L and 1102R cooperate with the touchscreen 202 superposed on the LC display 201 to function as soft buttons for input of the increment operation on the squeezing value.

Figure 11B:
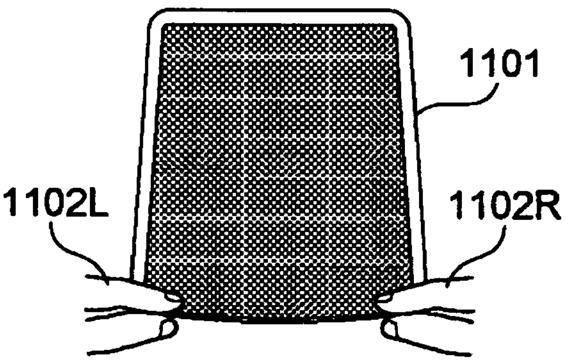

FIG. 11B is an example of a displayed image after several increment operations are done after the state shown in FIG. 11A. In this example, the face-down target card 1101 is displayed to be slightly raised up at the nearer end, however, the face thereof is not shown yet. The player is required to carry out some increment operations to know the rank of the card.

Figure 11C:
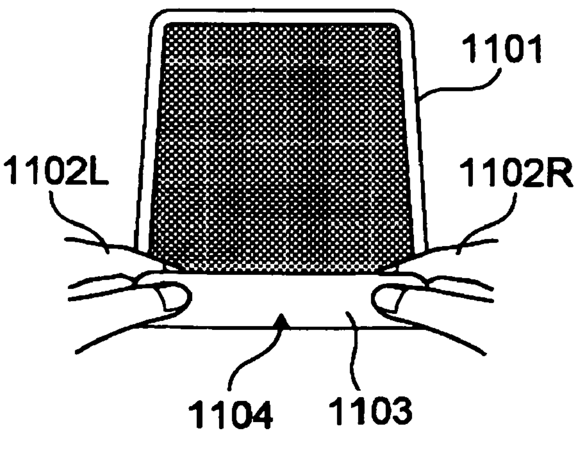

FIG. 11C is an example of a displayed image after increment operations are done so as to make the squeezing value to be a maximum value. In this example, the face-down target card 1101 is displayed to be further raised up at the nearer end and the border of the face 1103 comes to be visible. A mark 1104 of the suit is partly visible. Thereby, the player may guess the suit and the rank of the target card 1101 from how the mark 1104 appears.

FIGS. 12A through 12D are other examples of displayed images after increment operations are done so as to make the squeezing value to be a maximum value.

Figure 12A:
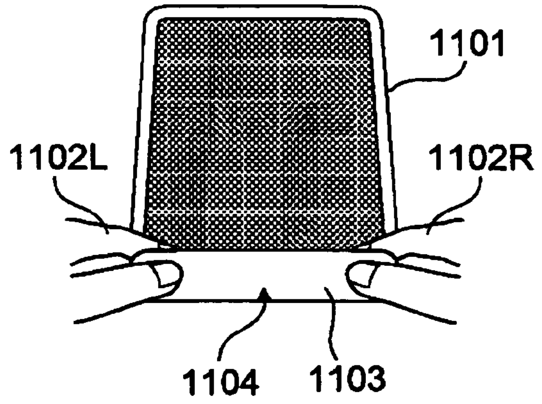
FIGS. 12A through 12D illustrate examples of images on a display of the player's terminal in the course of a display process for squeezing.

FIG. 12A is an example in which only one of a tip end of the mark 1104 is visible at the border of the face 1103. In this case, the player can guess that the rank of the card is 2 or 3 and which the suit (spade, heart, diamond or club) is from the shape and the color of the mark.

Figure 12B:
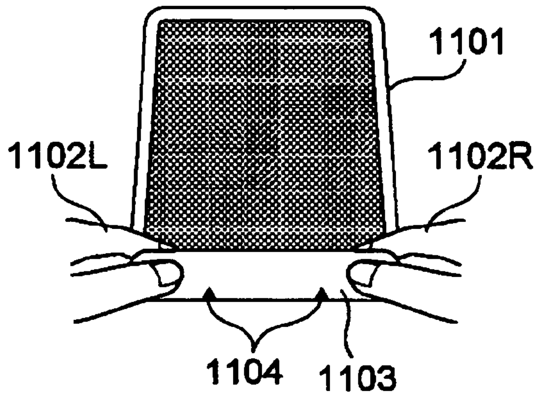

FIG. 12B is an example in which two of tip ends of the mark 1104 are visible at the border of the face 1103. In this case, the player can guess that the rank of the card is any of from 4 to 10.

Figure 12C:
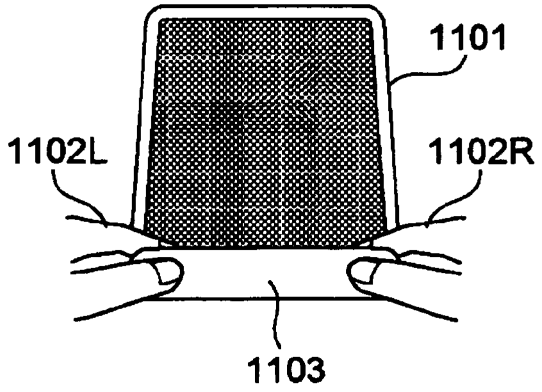

FIG. 12C is an example in which no tip end of the mark is visible at the border of the face 1103. In this case, the player can guess that the rank of the card is A (Ace).

Figure 12D:
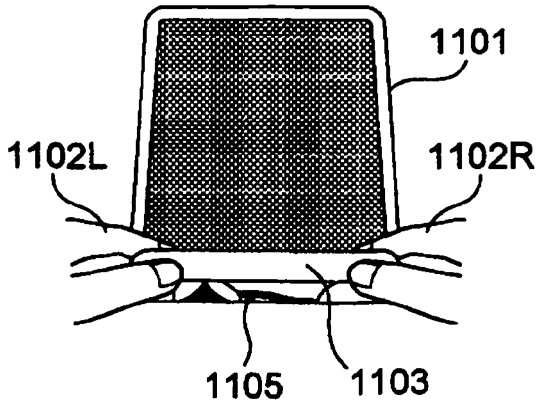

FIG. 12D is an example in which a figure or a frame 1105 defining the figure on the face, not the mark 1104, is visible at the border of the face 1103. In this case, the player can guess that the rank of the card is any of J (Jack: 11), Q (Queen: 12), and K (King: 13).

Figure 13A:
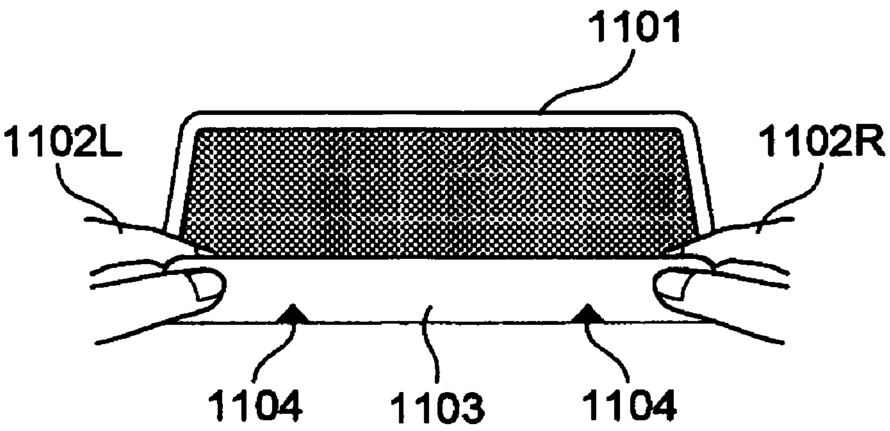
FIGS. 13A through 13C illustrate examples of images on a display of the player's terminal in the course of a display process for squeezing.
Figure 13B:
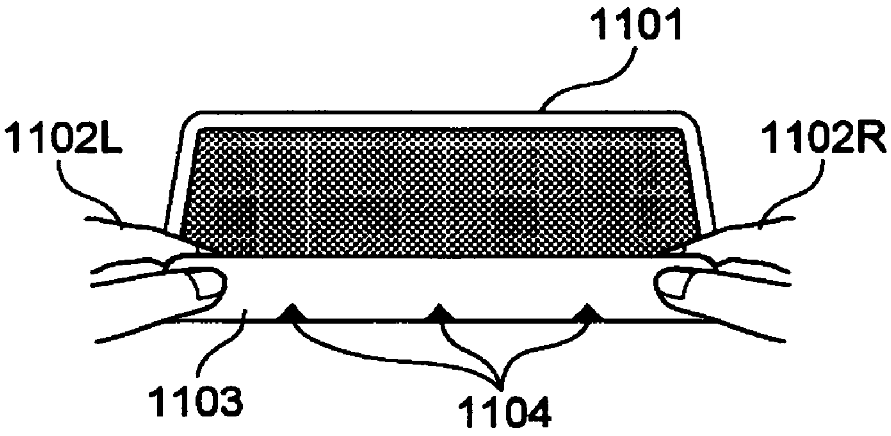
Figure 13C:
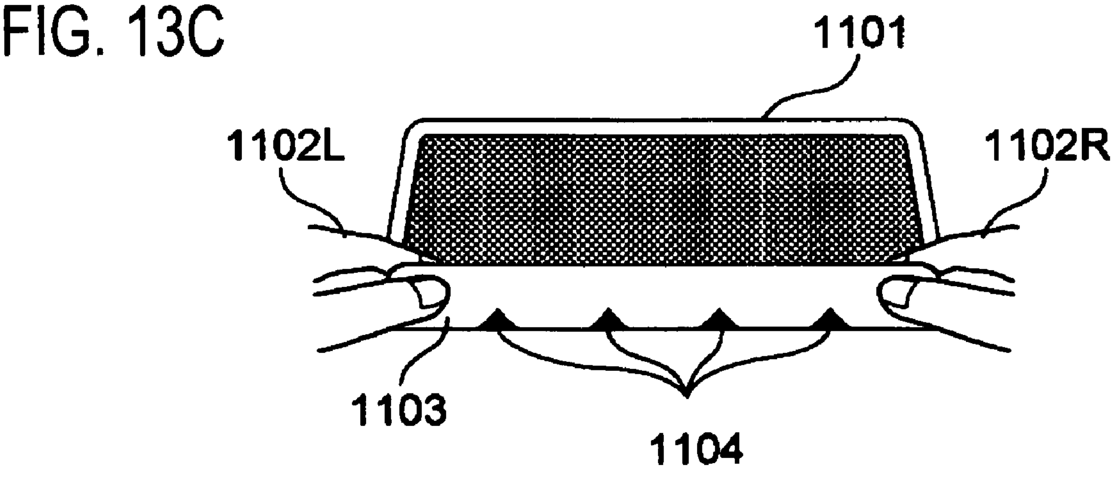

Then, in the case of the example shown in FIG. 12B, the target card 1101 may be guessed to be any of from 4 to 10, however, it is insufficient to close in on the suspect. In such a case, the player may change the orientation of the card and further squeeze the card in the changed orientation. FIGS. 13A through 13C are such examples of displayed images after the orientation is changed and increment operations are done so as to make the squeezing value to be a maximum value.

FIG. 13A is an example that the rank of the card is 4 or 5. In this case, two of tip ends of the mark 1104 come to be visible at the side border of the face 1103. Therefore, the player can guess that the rank of the card is 4 or 5.

FIG. 13B is an example that the rank of the card is any of 6, 7 and 8. In this case, three of tip ends of the mark 1104 come to be visible at the side border of the face 1103. Therefore, the player can guess that the rank of the card is any of 6, 7 and 8.

FIG. 13C is an example that the rank of the card is 9 or 10. In this case, four of tip ends of the mark 1104 come to be visible at the side border of the face 1103. Therefore, the player can guess that the rank of the card is 9 or 10. Thus the player can guess the face of the card by squeezing and have more opportunities to expect and enjoy winning or losing in the game on the basis of the guess.

Returning to FIGS. 10A and 10B, descriptions returns to the method of display processing carried out by the display processor 902.

The display processor 902 decides whether the player has input to change the orientation of the card (S1008 in FIG. 10B). If the player has input to change the orientation (Yes at S1008), the display process or changes the flag specifying the orientation of the card (0 to 1 or 1 to 0). Then, the step returns to the aforementioned S1005 and the image processing of the target card is processed with again (S1007).

If the player has not input to change the orientation (No at S1008), the display processor 902 decides whether the increment operation or the decrement operation has been input (S1010). If the increment operation or the decrement operation has been input (Yes at S1010), the display processor 902 updates the squeezing value upon the increment operation or the decrement operation. The step returns to the aforementioned S1005 and the image processing of the target card is processed with again (S1007). As a result, more squeezed or less squeezed card upon the increment operation or the decrement operation is displayed on the LC display 201.

Next, the display processor 902 decides whether operation of display termination has been input (S1012). If the player satisfies squeezing, he inputs the predetermined operation of the display termination to the gaming device 100, more particularly the main controller 301 to terminate the game, judge whether win or lose, and award allotment upon win or lose.

If the operation of the display termination has been input (Yes at S1012), the display processor 902 terminates the image processing of the target card and notifies the main controller 301 of the termination. On the contrary, when the operation of the display termination has not been input (No at S1012), the display processor 902 returns to S1008 after wait for a predetermined period (S1013) and waits for input by the player.

The operations of the display processor 902 are as above.

-2. Modified Example and Such- (1) In images on the display as shown in FIGS. 12 through 13, the finger images 1102L and 1102R may be displayed to hide a mark and a numeral on the corner of the card. Thrill by squeezing will become something different.

(2) In the above embodiment, the player's terminals 101 respectively have the display processor 902, however, it may be modified so that the main controller has the display processor 902. In this modification, the host display 104 displays the target card as shown in FIGS. 12 through 13 instead. Change of orientation of the card and the increment or decrement operation are carried out using the selected player's terminal 101. The main controller 301 receives notification of the result of the input from the player's terminals 101.

(3) The modification of the gaming device 100 will be described hereinafter.

Figure 14:
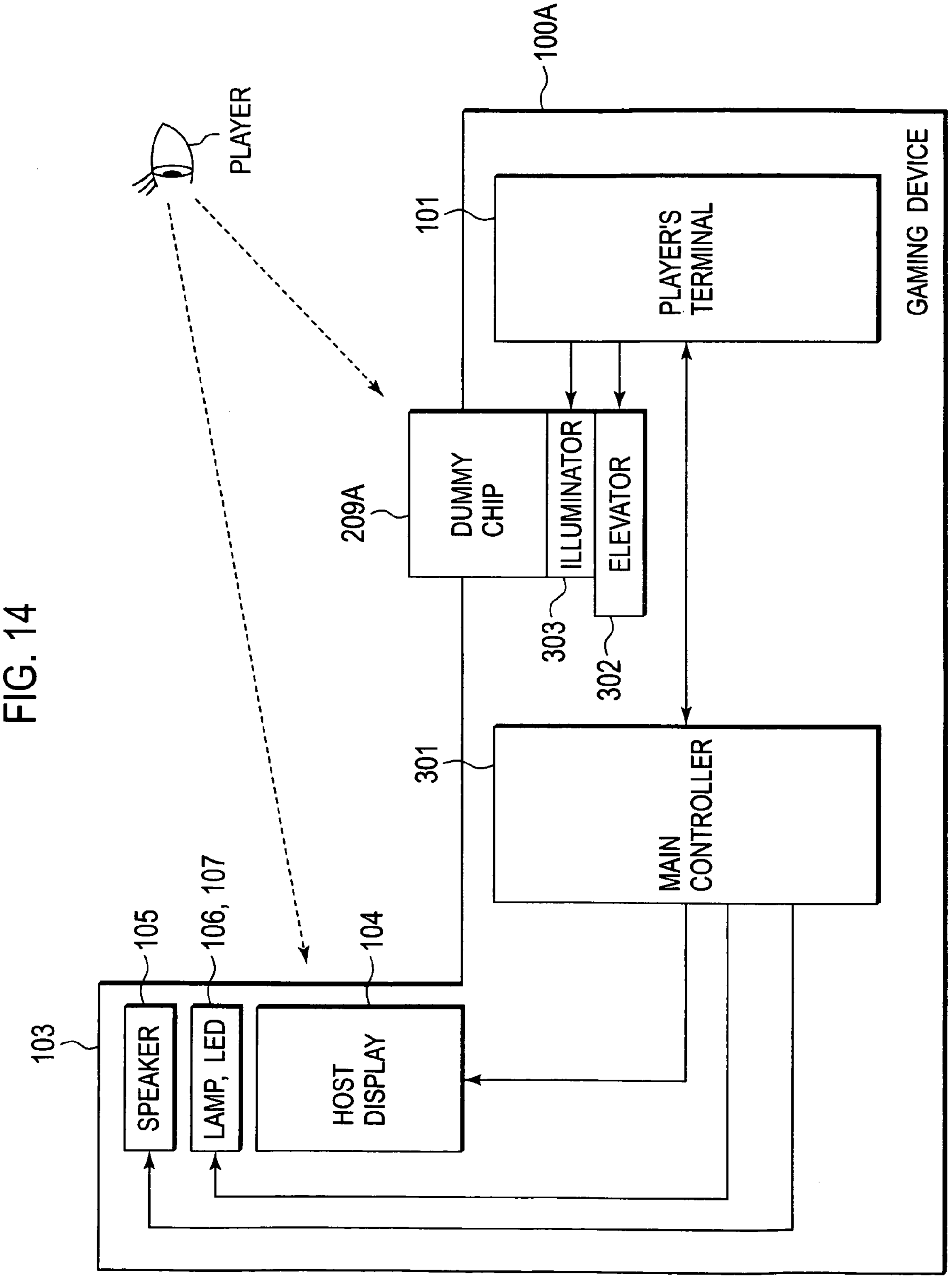
FIG. 14 is a block diagram of a control system in accordance with a modified embodiment of the present invention.

Referring to FIG. 14, the gaming device 100A is provided with a dummy chip 209A made of a material having transparency as similar to the panel 207. An illuminator 303 is arranged below the dummy chip 209A so that the dummy chip 209A emits light with controllable brightness and color as the panel 207. As such, the dummy chip 209A is made to have the same function as the panel 207 and do actions.

In the gaming device 100A, the illuminator 303 is made to ascend and descend as accompanying with the dummy chip 209A by the elevator 302. Therefore, the dummy chip 209A changes its position in the vertical direction by the elevator 302 and can emit the light with controllable brightness and color.

Meanwhile, the gaming device 100A is lack of the panel 207, however, it may be provided with the panel 207 as well as the dummy chip 209A.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A gaming device having a card game using a card set, comprising:

a main controller configured to determine a target card from the card set and generate a data to specify the target card; and a terminal configured to receive the data from the main controller, the terminal including:

an input receiver configured to store a plurality of squeezing values for determining an extent of an area of a portion of a face-down target card to be revealed and an extent of an area of a face-up portion of a target card to be returned to a face-down state;

an input device configured to receive an increment operation and a decrement operation and to select one of the plurality of squeezing values stored in the input receiver;

a display device configured to display an extent of an area of a face-down target card to be revealed and an extent of an area of a face-up portion of a target card to be returned to a face-down state determined by the squeezing value selected by the input device; wherein, the terminal is configured to store orientation data, the orientation data continuously updated in response to a selection of one of a plurality of target card orientations, the orientation data specifying the selected orientation; and the display device is configured to display an extent of an area of a face-down target card to be revealed and an extent of an area of a face-up portion of a target card to be returned to a face-down state in an orientation specified by the orientation data.

2. The gaming device of claim 1, wherein the input device includes a touchscreen superposed on the display device.

3. The gaming device of claim 1, wherein the plurality of orientations includes a lengthwise orientation and a crosswise orientation of the target card.

4. The gaming device of claim 1, wherein the display device is configured to hide a corner of a face of the target card with an image different from an image of the face of the target card when showing a portion of the face-down target card.

5. A method for display control in a gaming device having a card game using a card set, the method comprising:

accepting a data to specify a target card from the card set;

receiving an operation and selecting one of a plurality of squeezing values for determining an extent of an area of a portion of a face-down target card to be revealed and an extent of an area of a face-up portion of a target card to be returned to a face-down state in response to an increment operation and a decrement operation; and displaying an extent of an area of a portion of a face-down target card and an extent of an area of a face-up portion of a target card to be returned to a face-down state based on the selected squeezing value;

updating orientation data in response to a selection of one of a plurality of target card orientations, the orientation data specifying the selected orientation;

displaying an extent of an area of a portion of a face-down target card and an extent of an area of a face-up portion of a target card to be returned to a face-down state in an orientation specified by the orientation data;

changing a first orientation to a second orientation for turning over the target card in response to a selection; and further displaying an extent of an area of a portion of a face-down target card and an extent of an area of a face-up portion of a target card to be returned to a face-down state in the second orientation after displaying an extent of an area of a portion of a face-down target card and an extent of an area of a face-up portion of a target card to be returned to a face-down state in the first orientation for the identical target card.

6. The method of claim 5, wherein the plurality of orientations includes a lengthwise orientation and a crosswise orientation.

7. The method of claim 5, wherein the displaying step comprises hiding a corner of a face of the target card with an image different from an image of the face of the target card when showing a portion of the face-down target card.

* * * * *